Figure 1:
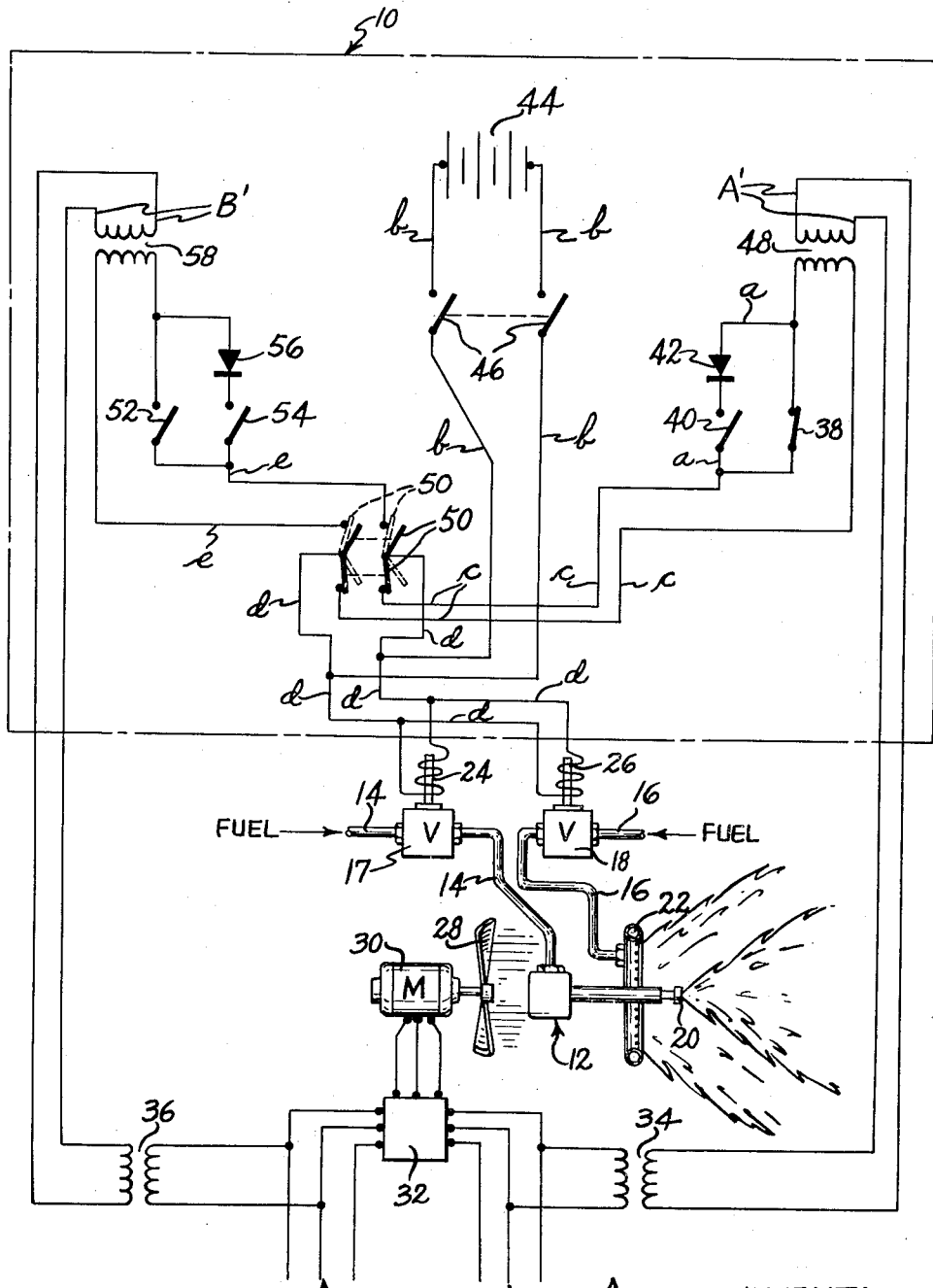

Oct. 30, 1962 B. W. DEVINE 3,061,736
CIRCUIT FOR SWITCHING ALTERNATING CURRENT POWER SOURCES
Filed Oct. 27, 1960 2 Sheets-Sheet 1

INVENTOR
BERNARD W. DEVINE
BY
ATTORNEY

Oct. 30, 1962 B. W. DEVINE 3,061,736
CIRCUIT FOR SWITCHING ALTERNATING CURRENT POWER SOURCES
Filed Oct. 27, 1960 2 Sheets-Sheet 2
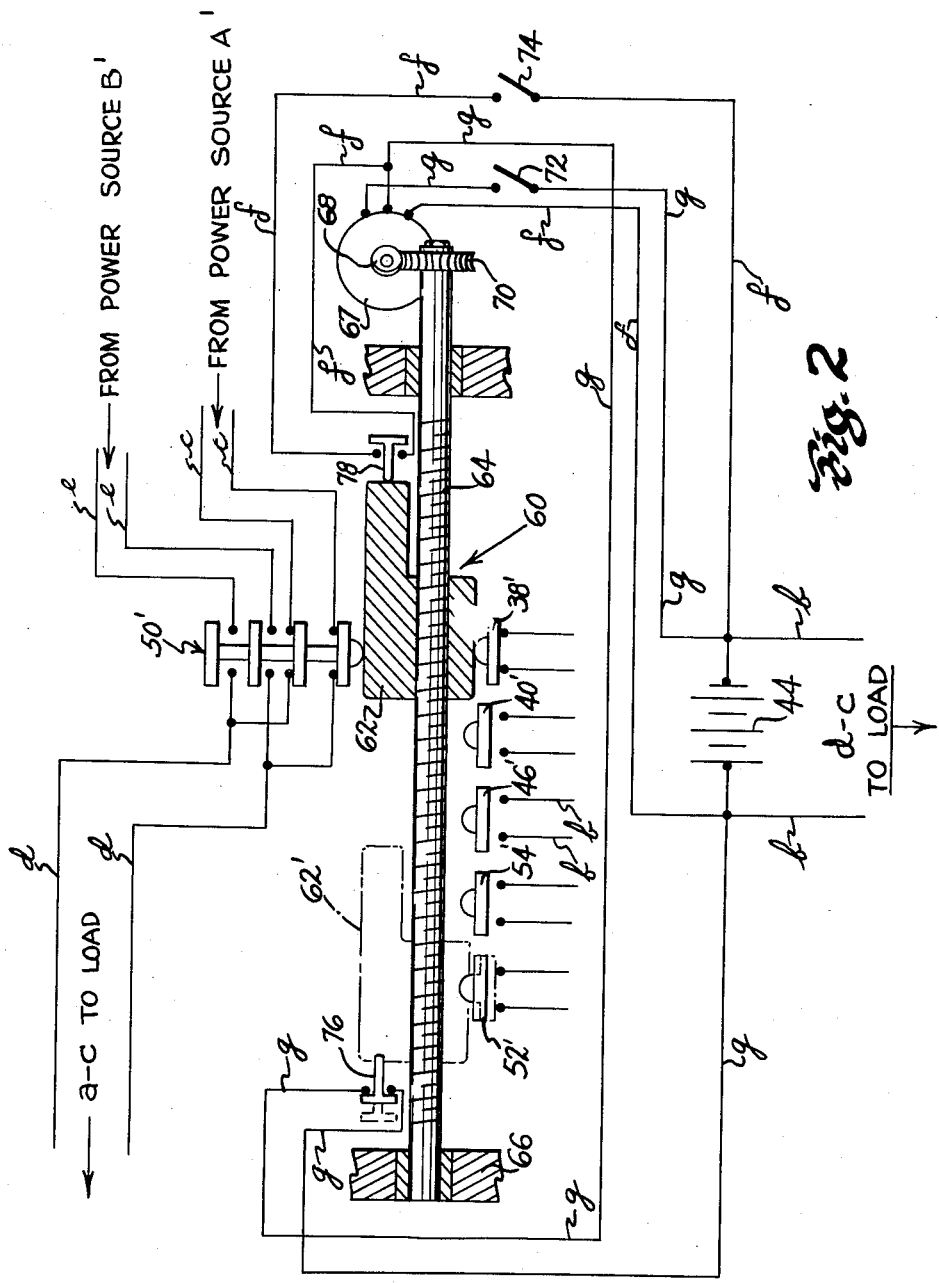
INVENTOR
BERNARD W. DEVINE
BY
ATTORNEY United States Patent Office 3,061,736
Patented Oct. 30, 1962

3,061,736
CIRCUIT FOR SWITCHING ALTERNATING
CURRENT POWER SOURCES
Bernard W. Devine, Southbridge, Mass., assignor to
American Optical Company, Southbridge, Mass., a
voluntary association of Massachusetts
Filed Oct. 27, 1960, Ser. No. 65,407
6 Claims. (Cl. 307—64)

This invention relates to the switching of a loaded electrical circuit from one source of alternating current power to another similar source of power and has particular reference to a novel switching circuit and method for accomplishing the above with assurance against load loss during the interim of change-over from an initial load supporting power source to another power source intended to take over and continue the support of said load.

It will become readily apparent hereinafter that the present invention relates to a power switching circuit and method which is adaptable to various forms of alternating current electrical installations wherein their is the need, or at least the potential need for a standby or auxiliary alternating current power source to operate a loaded circuit in the event of impending failure or malfunction of the power source normally used to support the load of said circuit.

In view of the fact that the switching circuit of the present invention may be applied with considerable advantage to a great many different alternating current systems which would be far too numerous to deal with individually herein, the present invention will be shown and described, for illustration purposes only, as being incorporated in a flame safeguard system of one type commonly used to protect boiler furnaces from explosion hazard.

Flame safeguard systems are typical of many installations which are urgently in need of an efficient, economical and reliable switch-over arrangement wherein a standby or auxiliary source of alternating current power can be thrown into service without interrupting or in any way affecting the service of the system. In this respect, boiler furnace flame safeguard systems are by nature and by specification built to "fail safe." By this, it is meant that an open circuit or abnormal power drop or other similar power failures or potentially dangerous disturbances in the power lines which service boiler furnaces cause the safeguard systems to close a safety shut-off valve (usually of the solenoid type) in the fuel supply line to the furnace. This causes a complete shut-down of the furnace burner. When a safeguard system is designed to "fail safe," even a momentary power failure causes a complete shut-down of the burner. Obviously, when a boiler furnace is providing steam, for generating plant electrical power or factory processing or heat or all three of these utilities simultaneously, unnecessary shut-down caused by power disturbances are extremely costly and disconcerting as well as hazardous.

While a boiler unit can be re-started immediately, explosion records prove conclusively that boiler start-ups account for 50 percent of all furnace explosions and when the start-up is on a crash basis to save a process or plant load, the probability of explosion skyrockets.

In view of the fact that the majority of power failures can be predicted by anticipating weather conditions or by observing malfunction of the power source before complete failure thereof, standby or auxiliary power sources are commonly provided and made available to boiler furnace installations or the like to meet such emergencies and prevent unnecessary boiler shutdowns.

Previous to this invention, however, there has been the serious problem of providing means and method for efficiently and economically shifting a loaded circuit from one alternating current power source to another without loss of the load. The problem of throw-over from one source of alternating current to another is complicated by the fact that during the interim of disconnection of one source of power from the load and connection of the other power source there is a temporary or momentary complete disconnection of all power from the load. In rotary forms of electrical equipment such as motors or the like which have momentum to continue their operation during said momentary disconnection, conventional throw-over switching devices serve the purpose in switching to auxiliary power sources. However, in systems such as will be described herein where a load is held in through the action of solenoid operated devices, the least interruption of power to the hold-in solenoids will cause them to drop out and thereby result in a loss of the load. Loss of load in a "fail safe" system for boiler furnaces, for example, will cause the burner fuel to be shut off and result in a complete furnace shut-down.

Various schemes for shifting over to auxiliary power in systems of the above-mentioned type have been tried with limited degrees of success and, in fact, all have in one way or another, been unreliable and/or impractical from the standpoint of efficiency of operation, dependability and cost of installation and maintenance.

Among the schemes which have been suggested and/or actually put into operation are the use of steam-driven auxiliary generators, inverters to convert D.-C. electricity from batteries to A.-C. for operation of safety equipment and least desirable of all, the conversion of all safety equipment to direct current operation. This latter suggestion would be unheard of in power plants already equipped with alternating current control systems.

In the case of the auxiliary-driven generator, two costly units would be required and if they were not properly maintained, reliability of operation would be considerably less than necessary. Such an installation would be economically undesirable.

The above-mentioned provision of an inverter for converting A.-C. to D.-C. to A.-C. in change-over from one A.-C. power supply to another is also economically undesirable since rotating equipment of this type is expensive and requires a spare unit for reliability.

The use of static converters and inverters with auxiliary battery systems for standby service has been considered but again equipment of this nature is subject to failure or malfunction and must be continually serviced. Furthermore, such converters have a cut-off characteristic which distorts the sine wave of its power output and might lead to troublesome conditions in the operation of A.-C. equipment.

While standby or auxiliary A.-C. power sources are readily obtainable and often immediately available, a regular A.-C. power supply and a similar standby or auxiliary supply cannot be paralleled without the expense and complications of phasing equipment.

The needs for all forms of phasing equipment, static or rotary converters or other schemes such as mentioned above are obviated by the switching circuit of the present invention which, as it will become apparent, employs conventional inexpensive and readily available throw switches in a unique circuit adapted to accomplish a switch-over from one A.-C. power source to another without load loss in a heretofore unbelievable manner of simplicity.

Accordingly, it is a principal object of the present invention to provide a novel switch-over circuit and method of the above character which offers exceptional reliability of service, is foolproof in operation and simple to install in substantially all forms of existing or prospective alternating current solenoid type load holding circuits or the like.

Another object is to provide a simple, extremely economical and dependable switching circuit for transferring one or more energized solenoids from one source of A.-C. operating power to another similar source of A.-C. power without de-energizing the solenoids at any instant during said switch-over.

Another object is to provide novel means and method for applying direct current to an A.-C. solenoid for hold-in purposes during only a brief interval of switch-over from one A.-C. source of power normally supporting said solenoid to another A.-C. source of power intended to take over the support of said solenoid.

Another object is to provide, as a part of a circuit of the above character, a unique arrangement for preventing said direct current hold-in electrical energy from opposing either of the said sources of A.-C. current during a switch-over from one to the other thereof.

Another object is to assure positive hold-in of a solenoid as described above with a direct current source of energy during switch-over from one source of A.-C. current to another by providing means to prevent feed-back of said direct current through the supply lines of either or both of said A.-C. current sources.

A further object is to provide a switch-over circuit of the above character which, when applied to boiler furnace flame safeguard systems or the like, will minimize furnace shutdowns and consequently minimize the inherent explosion hazard resulting from unnecessary refiring of the furnaces.

Other objects and advantages of the invention will become apparent from the following description when taken in conjunction with the accompanying drawings in which:

FIG. 1 is a schematic illustration of a preferred form of the invention which is designed more specifically to be operated manually; and FIG. 2 is a schematic representation of a modification of the invention embodying means for automatically operating the various switches of the circuit in FIG. 1.

In referring more particularly to FIG. 1 of the drawings, it will be seen that the switching circuit 10 of the invention which is shown, within the dot-dash outlines, for purposes of illustration as being used in conjunction with a conventional boiler furnace flame safeguard system. Such a system is normally intended to operate immediately in response to power failure or hazardous power disturbances to shut off the fuel supply to a boiler furnace burner or burners as the case may be.

For ease of illustration, a single furnace burner 12 has been diagrammatically illustrated as being connected by fuel supply lines 14 and 16 which pass through conventional solenoid operated shut-off valves 17 and 18 respectively. The burner 12 has been illustrated as having an oil burning nozzle 20 which is supplied by fuel from the line 14 and a gas burning ring 22 which is supplied by fuel from the line 16. The valves 17 and 18 in the lines 14 and 16 are of the usual type which are held open by solenoids 24 and 26 when the solenoids are energized to permit the passage of fuel to the burner and operate automatically to close when the solenoids 24 and 26 are de-energized thereby shutting off the supply of fuel to the burner.

Burners of this general description are, as it is well known, operated by the creation of a forced draft produced by a motor driven fan 28 or the like which causes propagation of the burner flames. The fan motor 30 is electrically connected to a suitable power supply as will be described shortly.

Since all power supplies are subject to malfunction or failure due to line trouble or other known causes, it is essential to provide an alternate or standby power supply in installations where boiler furnace burner failure must be minimized so that by switching from a failing or about to fail initial power source to an auxiliary power source, the burner can be held in operation.

For purposes of illustration, a main power supply has been designated as A, FIG. 1 and an auxiliary power source has been designated as B. These power sources may each be, for example, a three-phase 600-volt alternating current system. The power sources A and B are connected through a switch-over unit 32 such as for example, a conventional reversing magnetic line starter which can be operated to connect one or the other of the power sources A or B in circuit with the motor 30. In the event of an impending power failure at A, the switch-over mechanism 32 would be operated to disconnect the source A and place the source B in circuit with the motor 30 to keep the motor 30 in operation and prevent a shut-down of the forced draft created by the fan 28 which would obviously create a hazardous condition in the burner 20.

As pointed out hereinabove, the switch-over of rotary equipment such as motor 30 from one A.-C. power source to another similar source poses no particular problem since the inertia of the motor 30 will tend to keep the motor 30 operating during the brief interval of switch-over where the motor is momentarily disconnected from all power. Switching mechanisms such as 32 are conventional and for this reason, need no further description herein.

In view of the fact that power failures cannot always be detected or anticipated in time to permit a switch-over to auxiliary power, boiler furnace safety regulations require a safeguard system which will operate in response to power failure to automatically shut off fuel to the burners and thereby avoid the potential hazard of explosion or other dangerous conditions which would result from malfunction or failure of the forced draft produced by the fan 28. These flame safeguard systems which are usually far more elaborate than shown herein also operate to shut off the fuel to the burners for other reasons such as loss of ignition, fuel pump malfunction or dangerous pull-away of the flame from the burners, etc. However, because of the fact that this invention relates only to a switch-over circuit and method adaptable to flame safeguard or other similar alternating current systems, the problems and causes for tripping of the burner valves other than failure of the forced draft mechanism will not be discussed herein.

For proper understanding of this invention, it is sufficient to point out that A.-C. systems which employ solenoids such as 24 and 26 as their loads cannot at any instant be deenergized without causing the solenoids to drop out and, as in the case illustrated, close the valves 17 and 18. Thus, during switch-over of the circuit 10 from the power source A to the power source B, as will be described in detail shortly, means must be provided to prevent any momentary de-energization whatsoever of the solenoids 24 and 26.

Referring now to the connection of the circuit 10 with the respective power sources A and B, it can be seen that a tap is made in the lines of the three-phase source A to provide a single phase supply to one side of the circuit 10. Since the high voltage of the source A is not essential to the operation of the circuit and is actually undesirable, a step-down transformer 34 is placed in the line tap to provide the circuit 10 with an input of, for example approximately 115 volts. This, of course, is conventional practice where low voltage systems are to be fed from high voltage sources. In a similar manner, the other side of the circuit 10 is connected to the auxiliary power source B by a single phase tap through a step-down transformer 36 adapted to supply said other side of the circuit 10 with an approximately 115-volt single phase auxiliary power supply. Voltage values given herein are by way of example only.

From the above, it can be seen that the circuit 10 is then provided with a relatively low voltage source of power A' which will, for purposes of illustration, be considered to be its main supply and is also provided with a second source of power B' which will be considered to be its auxiliary supply.

As shown diagrammatically in FIG. 1, the switches throughout the circuit 10 are normally positioned so that all are open with the exception of 38 and 50 which connect the solenoids 24 and 26 directly in circuit with the main supply A'. Thus, the solenoids which, as mentioned above, are considered to be the load of the circuit 10, are energized or held-in to permit passage of fuel through the valves 17 and 18. This condition will be considered to be the normal operation of the circuit 10 wherein the main power supply A' is supporting its load (solenoids 24 and 26).

When a power failure is impending or is detected prior to complete failure in the main power lines A or A' or if, for any reason, an emergency or necessity should arise where the main power source A' to the circuit 10 must be disconnected, the load (solenoids 24 and 26) must be shifted to the auxiliary power source B'. In such an event, the switch-over from the A.-C. power source A' to source B' must be made without loss of the load. That is, without in any way de-energizing the solenoids 24 and 26 even for the slightest fraction of a second.

Since the phase relationships between two A.-C. power sources such as A' and B' are rarely, if ever, synchronous, it has, heretofore, been next to impossible to parallel two sources such as A' and B' without the use of expensive phasing equipment or without dropping out the load (solenoids 24 and 26). The circuit 10 of the invention, however, has provided means for shifting from the power source A' to the source B' without load loss in a simple, efficient and economical manner as follows:

The switch 38 which, as stated above, is normally in closed position, is bypassed by line a in which there is positioned a single pole normally open switch 40 in series with a half wave A.-C. rectifier 42 of any of the various well-known designs characterized to permit only one-half of the sine wave current to pass therethrough for the specific purpose to be pointed out shortly.

The first step in switching over from the power source A' to the power source B' is to close switch 40 so as to apply rectified or half-wave A.-C. current from A' to the solenoids 24 and 26. Having done so, the solenoids 24 and 26 are held in with the rectified or half-wave A.-C. current passing through line a and the switch 38 is thereafter opened to disconnect the full wave A.-C. from the said solenoids.

Next, a battery-supplied direct current is applied to the solenoids 24 and 26 to continue their hold-in. This feature of the invention takes advantage of the fact that A.-C. coils or solenoids, as in this case, will tolerate D.-C. current for at least a short period of time without becoming adversely affected or dropping out and it is pointed out that the switch-over operation which is now being described in step-by-step fashion is actually performed quite rapidly.

The D.-C. or direct current is supplied by a battery 44 connected through a double pole double throw switch 46 and lines b to the solenoids 24 and 26 as shown clearly in FIG. 1. Energizing the solenoids 24 and 26 with the battery-supplied D.-C. is accomplished by closing the switch 46. After this has been done, the switch 40 is opened to completely cut off the main power source A' from the load (solenoids 24 and 26).

It is pointed out at this time that while the load may be switched from full wave A.-C. directly to the D.-C. with little danger of any temporary interruption of current on the load, the rectifier 42 is provided in the circuit to prevent the A.-C. current from at any time tending to oppose and possibly causing momentary concelling out the D.-C. during the period between the closing of switch 46 and the opening of switch 40 when both the A.-C. and D.-C. are applied to the load simultaneously. By applying the half wave rectified A.-C. to the load during said switching period, no such opposition can take place. Actually, the D.-C., if anything, might be fortified temporarily by the rectified A.-C. current. The rectifier 42 is actually provided as added assurance against any momentary interruption of current on the load. Furthermore, in order to prevent a feedback of the D.-C. current through the main A.-C. source A' during the above-mentioned interval where both are applied to the load, a 1 to 1 blocking transformer 48 is placed in the A' line as shown in FIG. 1.

After having applied the holding D.-C. current from battery 44 to the load (solenoids 24 and 26) and disconnected the main power source A' as described above, the auxiliary power source B' is connected into the load as follows:

A main double pole double throw switch 50 is thrown from the position shown in full lines to the position shown by dotted outline to completely disconnect the lines c of the A' input circuit from the lines d leading to the load. The throwing of switch 50 then connects the lines e of the auxiliary power source B' into circuit with the load (solenoids 24 and 26). One of the lines e bypasses a switch 52 placed in the auxiliary power circuit B' and is provided with a switch 54 and a half-wave rectifier 56 in a manner identical to the arrangement embodying the rectifier 42 and switch 40 described above. The rectifier 56 is provided for the purpose described above in detail with relation to the rectifier 42.

To actually connect the current of the auxiliary source B' in circuit with the load so as to take over and support solenoids 24 and 26, the switch 54 is first closed. This applies rectified A.-C. current from B' to the load simultaneously with the D.-C. current from battery 44 which is, at this time, holding the load. With the rectified A.-C. from B' now ready to take over and hold the load, the switch 46 is opened to completely disconnect the D.-C. battery current from the load. The switch 52 is next closed to apply full wave A.-C. current from B' to the load (solenoids 24 and 26). Switch 54 is again opened to disconnect the rectifier 56 from the load which is, at this time, completely supported by the auxiliary power source B' with the main power source A' completely disconnected. The switch-over from power sources A' to B' is now completed.

It is pointed out that in the B' lines, a 1 to 1 transformer 58 is provided to prevent feed-back of D.-C. current during the above switch-over operation.

From the above, it can be seen that a complete switch-over from the main power source A' to the auxiliary power source B' is accomplished without, at any moment, losing the hold-in of the load (solenoids 24 and 26). Thus, by means of the simple, inexpensive and dependable switching circuit 10 of the invention which employs the use of nothing more than a pair of conventional inexpensive rectifiers 42 and 56, a battery 44 and conventional single and double pole throw switches, a change-over from one A.-C. power source to another can be accomplished with complete assurance against load loss.

It should be understood that in switching back from the power source B' to A' the procedure outlined above would be performed in reverse order. That is, briefly, the reverse order procedure would be as follows:

Close switch 54, open switch 52, close switch 46, open switch 54, reverse switch 50 to full line position, close switch 40, open switch 46, close switch 38 and open switch 40.

A modification of the invention is shown in FIG. 2 wherein an automatically operated switch tripping mechanism 60 is provided and which can be employed to operate the above-described step-by-step sequence of opening and closing the switches 38, 40, 46, 50, 54 and 52 automatically so as to bring about a switch-over of the load (solenoids 24 and 26) from the A.-C. power source A' to the A.-C. power source B' or vice versa.

Adapting the switch tripping mechanism 60 to the circuit 10 does not, in any way, require an alteration of the circuit 10 or the above-described actual step-by-step procedure used to operate the said circuit 10, it merely provides for automatic rather than manual operation of the various switches used to make the change-over from the power source A' to the power source B' or vice versa.

In order to key-in the following description relating to the mechanism 60 with the operation of the circuit 10 (FIG. 1), the switches 38, 40, 46, 50, 54 and 52 of FIG. 1 which are operated by the mechanism 60 will, in FIG. 2, be numbered 38', 40', 46', 50', 54' and 52' respectively.

It is pointed out that while the said switches in FIG. 2 have been illustrated as being of the push-button or microswitch type purely for mechanical convenience, their operation and function is identical to the respective switches of FIG. 1 whose function they are to simulate.

In addition to the switches 38', 40', 46', 50', 54' and 52', the mechanism 60 (FIG. 2) embodies a switch tripping cam 62 operable to engage the said switches sequentially through the action of a power-driven cam traversing mechanism embodying the motor-driven lead screw 64 shown in FIG. 2.

Referring more in detail to the mechanism 60, the lead screw 64 is threaded through the cam 62 and is supported adjacent each of its ends in suitable bearing mounts 66. The switch contact makers or switch heads as they will be referred to hereinafter of switches 38', 40', 46', 54' and 52' are preferably spring loaded or otherwise arranged to remain normally open. While the switch head of the switch 50' is also spring loaded or otherwise normally urged against the cam 62, it is as in the case of switch 50 (FIG. 1) a double pole, double throw switch wherein, in its up-position (as shown in FIG. 2), connects lines c to lines d and in its down-position, disconnects or breaks the circuit through lines c and d and simultaneously connects the lines e to d. It being understood that the lines c, d and e in FIG. 2 are the same lines referred to by the same reference letters in FIG. 1.

The lead screw 64 is driven by a reversible D.-C. motor 67 geared through a worm gear 68 and follower 70 of dimensions selected in accordance with the normal operating speed of the motor 67 and pitch of the lead screw to provide the cam with a desired rate of travel such as to trip the above-mentioned switches fast enough to minimize the time period required for switch-over of the circuit 10, but at such a rate as to assure complete closing and/or opening of adjacent switches in their proper sequence.

The motor 67 is energized by taps using lines f and g from the battery 44 of the circuit 10 of FIG. 1. The battery 44, of course, normally supplies D.-C. through lines b to the load as shown in FIG. 1 but in this instance, it serves the dual purpose of energizing not only the load, but further energizes the motor 67 when the motor 67 is put into operation by closing one or the other of the start switches 72 or 74 (see FIG. 2).

Since the D.-C. current from the motor is unidirectional, the motor 67 circuit shown in FIG. 2 will operate by the closing of one switch 72 or 74 to rotate the motor and lead screw in one direction. Closing the other switch will operate the motor 67 in the opposite direction.

Limit switches 76 and 78 in the motor 67 circuit operate to stop the motor when the cam 62 has reached its two required extremes of travel along the lead screw 64. The limit switches are biased by springs or other means (not shown) to normally urge their contact making parts toward each other and are pushed by the cam, when it reaches one end or the other of its travel, out of contact with their associate circuits to open and break the D.-C. circuit to the motor stopping the same. At least one limit switch is closed at all times.

Assuming that the motor 67 circuit embodying leads g, start switch 72 and limit switch 76 will, when energized, operate the motor to move the cam 62 from right to left as viewed in FIG. 2, the switching of the load (solenoids 24 and 26) from the power source A' to the power source B' through the use of the mechanism 60 of FIG. 2 is accomplished automatically as follows simply by doing nothing more than manually closing switch 72.

With switch 72 closed, and the limit switch 76 inherently normally closed at this time, as shown and described above, the motor 67 will operate to move the cam 62 to the left as viewed in FIG. 2. With switch 38' and the lower switch elements of 50' already closed by the cam 62 as shown, the cam 62 in first striking switch 40' will close it while still holding switch 38' and the lower switch elements of 50' closed. This brings the rectified A.-C. from A' to the load (see FIG. 1). Further movement of the cam 62 drops out switch 38' still holding in switch 40' and the lower switch elements of 50'. The load is now held in by rectified A.-C. alone. Still further movement of the cam 62 to the left engages switch 46' throwing D.-C. from battery 44 (see FIG. 1) onto the load along with the rectified A.-C. from A'. Continued movement of the cam to the left drops out switch 40' and also lower switch elements of 50'. The dropping out of switch 40' disconnects the rectified A.-C. from the load which is now completely held in by the D.-C. from battery 44. The dropping out of the lower switch elements of 50' disconnects lines c from the load thereby completely divorcing the load from the A' power source. In disconnecting the lines c, the upper switch elements of 50' drop and at the same time, connect lines e to the load (refer to FIG. 1 along with FIG. 2).

As the movement of the cam 62 progresses further to the left, it depresses switch 54' which connects the rectified A.-C. current from the source B' to the load while still holding switch 46' closed. Next, by the continuing movement of the cam 62 to the left, switch 46' drops out to disconnect the D.-C. from the load which is now held by the rectified A.-C. from the source B'. Upon approaching the switch 52', the cam closes said switch to apply full wave A.-C. from the source B' simultaneously with the rectified A.-C. from B'. At the end of its travel to the left, the cam holding in the full wave A.-C. from the source B' drops out the switch 54' to disconnect the rectified A.-C. from the source B' and the load is now in full command of the power source B' completely independent of and disconnected from the source A'.

It is pointed out that this operation is identical, step-by-step to that described above with relation to the manual operation of the circuit 10 shown in FIG. 1 and at no instant whatsoever are the solenoids 24 and 26 (the load) ever de-energized.

Upon approaching its end of travel to the left, the cam 62 strikes the limit switch 76 opening its contacts to break the D.-C. circuit to the motor 67. This stops the cam movement.

At this extreme left-hand position of the cam (represented by dot-dash outline 62') the limit switch 78 is in its closed position allowing a D.-C. circuit through the lines f and battery 44 to be made by closing switch 74. This, of course, will cause the cam to travel from left to right as viewed in FIG. 2. Therefore, when it is desired to switch the load (solenoids 24 and 26) of circuit 10 (FIG. 1) back from the power source B' to the power source A' with the automatic switching mechanism of FIG. 2, the motor 67 start switch 74 is closed and a reverse order of the events or step-by-step switching procedure just described will automatically take place.

It should be understood that either with the first described manual operation of the switching circuit 10 or the automatic operation involving FIG. 2 combined with FIG. 1, an identical sequence of switching steps is followed to transfer power from the source A' to the source B' or vice versa. Furthermore, in all instances, the invention provides for the switching from one A.-C. power source to another A.-C. power source absolutely and assuredly without a loss of the load at any instant.

From the foregoing, it can be seen that an improved, simple and economical means and method have been provided for accomplishing all of the objects and advantages of the invention. However, it should be apparent that many changes in the details of construction, arrangement of parts and steps in the method may be made without departing from the spirit of the invention as expressed in the accompanying claims and the invention is not limited to the exact matters shown and described as only preferred matters have been given by way of illustration.

Having described my invention, I claim:

1. A circuit of the character described for switching a load from a first source of full-wave alternating current to a second source of similarly characterized alternating current through the use of a direct current source without causing loss of load during said switching comprising a plurality of pre-arranged electrical lines extending from each of said electrical current sources, a selector switch commonly connected through said electrical lines to said load, said selector switch being adapted to receive lines from said first and second sources of alternating current and operable to place one or the other of said lines in circuit with said commonly connected lines to said load, a first switch operable to connect and disconnect said first source of full-wave alternating current to and from said selector switch, first rectifying means associated with said first source of full-wave alternating current for producing a first half-wave alternating current supply from said first source of full-wave alternating current, a second switch operable to connect and disconnect said first source of half-wave alternating current to and from said selector switch, said lines from said direct current source being arranged to bypass said selector switch and connect said direct current source to said load, a third switch operable to connect and disconnect direct current from said source thereof to and from said load, a second rectifier associated with said second source of full-wave alternating current for producing a second supply of half-wave alternating current from said second source of full-wave alternating current, a fourth switch operable to connect and disconnect said second supply of half-wave alternating current to and from said load and a fifth switch associated with said second source of full-wave alternating current operable to connect and disconnect the same to and from said load.

2. A circuit of the character described for switching a load from a first source of full-wave alternating current to a second source of similarly characterized alternating current through the use of a direct current source without causing loss of load during said switching comprising switching means adapted to connect and disconnect said first source of full-wave alternating current to and from said load, first rectifying means associated with said first source of full-wave alternating current for producing a first half-wave alternating current supply from said first source of full-wave alternating current, switching means adapted to connect and disconnect said first source of half-wave alternating current to and from said load, switching means adapted to connect and disconnect direct current from said source thereof to and from said load, a second rectifier associated with said second source of full-wave alternating current for producing a second supply of half-wave alternating current from said second source of full-wave alternating current, switching means adapted to connect and disconnect said second supply of half-wave alternating current to and from said load and switching means associated with said second source of full-wave alternating current adapted to connect and disconnect the same to and from said load.

3. A circuit through which a coil may be energized by and selectively switched over from one or the other of two sources of full-wave alternating current without becoming de-energized through the use of a direct current hold-in source comprising a double pole double throw switch having a common electrical connection in circuit with said coil, first electrical lines leading from a first of said sources of full-wave alternating current to first poles of said double pole double throw switch, second electrical lines leading from a second of said sources of full-wave alternating electrical energy to the second poles of said double pole double throw switch, a single pole single throw switch in each of said lines from said first and second sources of full-wave alternating current operable to connect and disconnect energy from said respective sources of full-wave alternating current to and from said double pole double throw switch, electrical lines shunting each of said single pole single throw switches, a half-wave alternating current rectifier and a single pole single throw switch in series with each other in each of said shunt lines, said single pole single throw switches in said shunt lines being operable to connect and disconnect their respective rectifiers in circuit with their respective first and second electrical lines, electrical conducting direct current lines leading from said direct current source to said coil and bypassing said double pole double throw switch to feed said direct current directly to said coil and a double pole single throw switch in said direct current lines operable to connect and disconnect said direct current source to and from said coil.

4. A circuit through which a coil may be energized by and selectively switched over from one or the other of two sources of alternating current without becoming de-energized through the use of a hold-in direct current source of electrical energy comprising a first switch having a common electrical connection in circuit with said coil and further having dual connection means adapted to receive alternating current carrying lines from each of said alternating current sources, said switch being constructed and arranged to make circuit at all times between one of said dual connection means and said common connection with said coil and further being operable to be selectively switched from one of said dual connection means to the other thereof, first electrical lines leading from a first of said sources of full-wave alternating current to a first of said dual connection means on said first switch, second electrical lines leading from the second of said sources of full-wave alternating current to the second of said dual connection means on said first switch, a second switch in each of said lines from said first and second sources of full-wave alternating current operable to connect and disconnect energy therefrom to and from said first switch, electrical lines shunting each of said second switches, a half-wave alternating current rectifier and a third switch in series with each other in each of said shunt lines, said third switches being operable to electrically connect and disconnect said rectifiers to and from their respective associated first and second electrical lines, electrical conducting direct current lines leading from said direct current source to said coil and bypassing said first switch adapted to feed direct current from said supply thereof directly to said coil and a fourth switch in said direct current lines operable to connect and disconnect said direct current source to and from said coil.

5. A circuit of the character described for switching a load from a first source of full-wave alternating current to a second source of similarly characterized alternating current through the use of a direct current source without causing loss of load during said switching comprising a plurality of prearranged electrical lines extending from each of said electrical current sources, a selector switch commonly connected through said electrical lines to said load, said selector switch being adapted to receive lines from said first and second sources of alternating current and operable to place one or the other of said lines in circuit with said commonly connected lines to said load, a first switch operable to connect and disconnect said first source of full-wave alternating current to and from said selector switch, first rectifying means associated with said first source of full-wave alternating current for producing a first half-wave alternating current supply from said first source of full-wave alternating current, a second switch operable to connect and disconnect said first source of half-wave alternating current to and from said selector switch, said lines from said direct current source being arranged to bypass said selector switch and connect said direct current source to said load, a third switch operable to connect and disconnect direct current from said source thereof to and from said load, a second rectifier associated with said second source of full-wave alternating current for producing a second supply of half-wave alternating current from said second source of full-wave alternating current, a fourth switch operable to connect and disconnect said second supply of half-wave alternating current to and from said load and a fifth switch associated with said second source of full-wave alternating current operable to connect and disconnect the same to and from said load and means for automatically operating said switches in a desired sequence.

6. A circuit of the character described for switching a load from a first source of full-wave alternating current to a second source of similarly characterized alternating current through the use of a direct current source without causing loss of load during said switching comprising a plurality of prearranged electrical lines extending from each of said electrical current sources, a selector switch commonly connected through said electrical lines to said load, said selector switch being adapted to receive lines from said first and second sources of alternating current and operable to place one or the other of said lines in circuit with said commonly connected lines to said load, a first switch operable to connect and disconnect said first source of full-wave alternating current to and from said selector switch, first rectifying means associated with said first source of full-wave alternating current for producing a first half-wave alternating current supply from said first source of full-wave alternating current, a second switch operable to connect and disconnect said first source of half-wave alternating current to and from said selector switch, said lines from said direct current source being arranged to bypass said selector switch and connect said direct current source to said load, a third switch operable to connect and disconnect direct current from said source thereof to and from said load, a second rectifier associated with said second source of full-wave alternating current for producing a second supply of half-wave alternating current from said second source of full-wave alternating current, a fourth switch operable to connect and disconnect said second supply of half-wave alternating current to and from said load and a fifth switch associated with said second source of full-wave alternating current operable to connect and disconnect the same to and from said load and a motor-driven cam switch tripping member constructed and arranged to operate said switches automatically.

References Cited in the file of this patent

UNITED STATES PATENTS

| | | |
|---|---|---|
| 2,225,335 | Dostal | Dec. 17, 1940 |
| 2,248,511 | Rust | July 8, 1941 |
| 2,263,320 | Trucksess | Nov. 18, 1941 |